(12) United States Patent
Ping et al.

(10) Patent No.: US 12,489,378 B2
(45) Date of Patent: Dec. 2, 2025

(54) SUPERHYDROPHOBIC MODIFIED FILM AND MODIFICATION METHOD, AND TRIBOELECTRIC NANOGENERATOR (TENG) COMPOSED THEREOF AND PREPARATION METHOD

(71) Applicant: ZHEJIANG UNIVERSITY, Hangzhou (CN)

(72) Inventors: Jianfeng Ping, Hangzhou (CN); Qi Zhang, Hangzhou (CN); Yibin Ying, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 614 days.

(21) Appl. No.: 17/924,698

(22) PCT Filed: Jun. 22, 2021

(86) PCT No.: PCT/CN2021/101429
§ 371 (c)(1),
(2) Date: Nov. 11, 2022

(87) PCT Pub. No.: WO2022/198814
PCT Pub. Date: Sep. 29, 2022

(65) Prior Publication Data
US 2023/0180680 A1 Jun. 15, 2023

(30) Foreign Application Priority Data

Mar. 23, 2021 (CN) .......................... 202110309075.8
Mar. 23, 2021 (CN) .......................... 202110309081.3

(51) Int. Cl.
*H02N 1/04* (2006.01)
(52) U.S. Cl.
CPC .................................. *H02N 1/04* (2013.01)

(58) Field of Classification Search
CPC .................................. C08L 23/06; H02N 1/04
(Continued)

(56) References Cited

U.S. PATENT DOCUMENTS 6,417,013 B1 * 7/2002 Teixeira ............ H01J 37/32082
117/85
10,439,517 B2 * 10/2019 Wang ...................... H02N 1/04
(Continued)

FOREIGN PATENT DOCUMENTS

CN 107556510 A 1/2018
CN 111825880 A 10/2020
(Continued)

OTHER PUBLICATIONS

Daniel Ebert, et al., Transparent, superhydrophobic, and wear-resistant surfaces using deep reactive ion etching on PDMS substrates, Journal of Colloid and Interface Science, 2016, pp. 82-90, vol. 481.

*Primary Examiner* — Terrance L Kenerly
*Assistant Examiner* — Theodore L Perkins
(74) *Attorney, Agent, or Firm* — Bayramoglu Law Offices LLC

(57) ABSTRACT

A superhydrophobic modified film and modification method, and a triboelectric nanogenerator (TENG) composed thereof and a preparation method are disclosed. A polyethylene (PE) film is etched and deposited with an inductively coupled plasma (ICP) etcher in sequence. A nano-textured structure is formed on an upper surface of the PE film and a fluorocarbon layer is further deposited for modification. An upper electrode of the film is constructed by sticking a piece of ultra-thin copper tape on a superhydrophobic surface of the superhydrophobic modified film, and a lower electrode of the film is constructed by spin-coating a conductive polymer on a lower surface of the film after $O_2$ plasma treatment. Thus, the TENG with high output and a double-electrode (Continued)

working mode based on the superhydrophobic modified greenhouse film is constructed. According to the modification method, the nano-textured structure is constructed on the surface of the film.

8 Claims, 11 Drawing Sheets

(58) Field of Classification Search
USPC .......................................................... 310/310
See application file for complete search history.

(56) References Cited

U.S. PATENT DOCUMENTS

| 2013/0211310 A1* | 8/2013 | Bommarito | B08B 17/06 |
| | | | 428/141 |
| 2014/0246950 A1* | 9/2014 | Wang | H02N 1/04 |
| | | | 310/310 |
| 2021/0069939 A1* | 3/2021 | Hedhammar | B29C 33/424 |

FOREIGN PATENT DOCUMENTS

| CN | 211791321 U | 10/2020 |
| CN | 112104255 A | 12/2020 |

* cited by examiner

▓ Upper Electrode (Copper Tape) ▓ Lower Electrode (PEDOT:PSS)  PE Film

SUPERHYDROPHOBIC MODIFIED FILM AND MODIFICATION METHOD, AND TRIBOELECTRIC NANOGENERATOR (TENG) COMPOSED THEREOF AND PREPARATION METHOD

CROSS REFERENCE TO THE RELATED APPLICATIONS

This application is the national phase entry of International Application No. PCT/CN2021/101429, filed on Jun. 22, 2021, which is based upon and claims priority to Chinese Patent Application No. 202110309075.8, filed on Mar. 23, 2021; Chinese Patent Application No. 202110309081.3, filed on Mar. 23, 2021, the entire contents of which are incorporated herein by reference.

TECHNICAL FIELD

The present disclosure relates to a film of superhydrophobic modification technology and modified preparation method, and a triboelectric nanogenerator (TENG) composed thereof and a preparation method. In particular, the present disclosure relates to a superhydrophobic modified greenhouse film and a superhydrophobic modification method thereof, and a TENG constructed with the superhydrophobic modified greenhouse film as a triboelectric layer for collecting raindrop energy in a double-electrode working mode and a preparation method of the TENG.

BACKGROUND

A greenhouse is an enclosed structure that uses solar radiation to create a microclimate suitable for plant growth and is one of the typical forms of agricultural production. The covering material is the most important component of the greenhouse structure. A commonly used material for the covering is plastic film, especially polyethylene (PE) film. The efficient operation of modern greenhouses requires the energy to supply their heating, ventilation, irrigation, and automation control. The traditional energy supply methods are likely to cause greenhouse gas emissions and accelerate global warming and environmental degradation. Therefore, the integration of photoelectric devices on greenhouse covering materials has been widely implemented, of which photovoltaic equipment is the most widely used.

As an important component of the greenhouse, the plastic film has a service life of generally about one year. During use, dust and grass clippings in the environment often adhere to the surface of the film. Due to poor hydrophobicity, even after the washing by rainwater, the film is not easily cleaned and has to be discarded. At present, recycling these films is not easy, and they are likely to cause "white pollution". Therefore, in order to avoid the aggravation of environmental pollution, it is necessary to solve the fundamental problem of how to prolong the service life of the film.

There are two reasons why these plastic films are discarded. One is that these plastic films are seriously damaged during daily use, and the other is that their light transmittance is significantly reduced after long-term use, which is not conducive to the growth and development of plants in the greenhouse. The breakage of the film is caused by improper use and environmental factors (such as violent storms), which is usually unavoidable. The existing film has poor hydrophobicity and will become gray after long-term use, which is not conducive to plant growth. The prior art lacks convenient and feasible technical means to modify the films to increase their hydrophobicity. Common superhydrophobic modification technologies, such as wax curing, template method, physical/chemical vapor deposition method, etching method, photolithography method and others, may require expensive silicon molds or require high temperature and vacuum conditions, and have a complex manufacturing process, which are undesirable, for the modification of plastic films.

These methods are not always feasible for the photovoltaic equipment widely used in greenhouse planting at present. Because many places on the planet receive abundant rainfall, especially in oceanic or tropical climates where it rains year-round, and annual precipitation may exceed 2 meters. Therefore, the collection of raindrop energy during rainfall, as a very common natural phenomenon in the agricultural production process, seems to be a preferable option. A novel energy supply device is developed to collect energy on rainy days and convert it into electric energy for use.

The TENG collects imperceptible mechanical energy with low energy density and low frequency in the environment based on the coupling of triboelectrification and electrostatic induction. Therefore, the TENG provides a new idea for power generation by using rainfall. This rainwater-related energy can solve the problem that the photovoltaic equipment cannot operate on rainy days. For the greenhouse, raindrops fall directly on the covering material, generating a primary electric energy output during contact with and separation from the covering material. However, most of the existing TENGs that collect the raindrop energy have low output performance, and the generated electric energy cannot meet the energy supply needs of greenhouse operations. In addition, the collection of the raindrop energy requires precise control of the surface properties of solids during liquid-solid contact. If the solid surface is not conducive to the rapid sliding of raindrops, a low output is caused. If the solid surface has superhydrophobic property, the raindrops can quickly slide off, and there will be a high output.

SUMMARY

In order to solve the existing problems as described in the Background, the present disclosure provides a superhydrophobic modification method for the greenhouse film and the superhydrophobic modified film obtained by the modification method, a greenhouse film-based TENG constructed from the superhydrophobic modified film, and a preparation method.

An objective of the present disclosure is to make up for the deficiency of poor hydrophobicity of the existing plastic film. Through the superhydrophobic modification technology, the surface of the film is nano-textured and is further covered with a layer of fluorocarbon compound with low surface energy, which not only endows the film with superhydrophobic property, but also enables the film to obtain self-cleaning ability. The light transmittance of the film is also well maintained, such that the service life is prolonged for long-term use, and it is also more conducive to the utilization of solar energy by plants in the greenhouse.

An objective of the present disclosure is to fill the gap in existing photovoltaic equipment that efficient operation on cloudy and rainy days cannot be achieved. The TENG for the collection of raindrop energy in the environment is constructed by using the superhydrophobic greenhouse film as the triboelectric layer, the conductive polymer coating as the lower electrode, and the copper tape as the upper electrode.

The present disclosure adopts the following technical solutions.

I. Superhydrophobic Modification Method for a Greenhouse Film

The present disclosure first uses a mixture of oxygen ($O_2$) and trifluoromethane ($CHF_3$) (a flow ratio (sscm) of 1:3) as a process gas to etch a PE film for 10 min to obtain a nanostructured PE film.

A thin fluorocarbon compound layer is further deposited on the nanostructured PE film by using an octafluorocyclobutane ($C_4F_8$) gas under the same conditions for 30 s.

Specifically, a superhydrophobic surface of the PE film in the present disclosure is constructed by a two-step method of inductively coupled plasma (ICP) and nano-texturing, and the technical solution is specified as follows:

1) placing a PE film in an ICP etcher;
2) etching an upper surface of the PE film for a period of time by the ICP etcher, such that a nano-textured structure is formed on the upper surface of the PE film to obtain a nanostructured PE film; and
3) depositing the upper surface of the PE film for a period of time by the ICP etcher, such that a fluorocarbon layer is deposited on the nano-textured structure of the PE film to further ensure and enhance the superhydrophobicity. In this step, the surface of the PE film is covered with a layer of fluorocarbon compound with low surface energy to enhance superhydrophobic property.

In step 2), the upper surface of the PE film is etched at a set ICP power of 100 W and a radio frequency (RF) power of 50 W under the presence of $O_2$ and $CIF_3$ at an air pressure of 30 mTorr for 10 min.

In step 2), $O_2$ and $CIF_3$ have a flow ratio of 1:3.

In step 2), flow rates of $O_2$ and $CHF_3$ are set as 15 and 45 standard cubic centimeter per minute (sccm), respectively.

In step 3), the upper surface of the PE film is deposited at a set ICP power of 100 W and an RF power of 50 W under the presence of $C_4F_8$ at an air pressure of 30 mTorr for 30 s.

In step 3), the flow rate of the $C_4F_8$ is set as 50 sccm.

The first step of the present disclosure is to conduct fluorocarbon plasma treatment of the nanostructured surface on the PE film.

The second step is to deposit a fluorocarbon layer on the surface to further ensure the superhydrophobicity.

After the above two-step treatment, the optimal treatment process is obtained by measuring the water static contact angle of the surface of the film and characterizing the surface of the film by scanning electron microscopy (SEM) and energy dispersive spectroscopy (EDS). The film is modified under the optimal treatment process to verify the self-cleaning ability. Finally, a greenhouse film with superhydrophobic and self-cleaning properties is obtained.

II. Superhydrophobic Modified Film Prepared by the Above Modification Method

After the film of the present disclosure has superhydrophobic property, its self-cleaning ability is significantly improved, and dust and grass clippings adhering to the surface can be easily washed away with only a small amount of rainwater. In this case, the film always maintains excellent light transmittance, which not only prolongs its service life but also facilitates the growth and development of plants.

III. Greenhouse Film-Based TENG for Raindrop Energy Collection

The greenhouse film-based TENG is composed of a superhydrophobic modified film, a lower electrode, and an upper electrode. The lower electrode is arranged on the lower surface of the modified film, and the upper electrode is arranged on an upper surface of the modified film (namely, a superhydrophobic surface). The upper surface of the modified film is a superhydrophobic surface, and the lower surface is a hydrophilic surface.

The lower electrode and the upper electrode are led out and connected to the outside through wires.

The TENG is constructed on a greenhouse film. During rainfall, raindrops contact the upper electrode on the upper surface of the superhydrophobic modified film to generate a continuous electrical output through a process of contact electrification and electrostatic induction.

The superhydrophobic modification of the film of the present disclosure is to make the upper surface of the film have superhydrophobic property through ICP treatment, and the specific treatment is divided into a two-step method.

IV Preparation Method for the Greenhouse Film-Based TENG for Raindrop Energy Collection 1) Preparation of the Modified Film (Superhydrophobic Film) with Superhydrophobic Property on the Upper Surface
2) Preparation of the lower electrode
3) Preparation of the upper electrode
4) Preparation of the TENG The specific implementation measures an output voltage. The copper tape led out from the upper and lower electrodes is connected to positive and negative electrodes of an oscilloscope to measure the output voltage.

Step 1) is specified as follows:

1.1) Placing a PE Film in an ICP Etcher;
1.2) under conditions of a set ICP power of 100 W and an RF power of 50 W, gas selection of $O_2$ and $CHF_3$ (flow rates of $O_2$ and $CHF_3$ are set as 15 and 45 sccm, respectively), and an air pressure of 30 mTorr, etching an upper surface of the PE film for 10 min by the ICP etcher, such that a nano-textured structure is formed on the upper surface of the PE film to obtain a nanostructured PE film; and
1.3) under conditions of a set ICP power of 100 W and an RF power of 50 W, gas selection of $C_4F_8$ (a flow rate of the $C_4F_8$ is set as 50 sccm), and air pressure of 30 mTorr, depositing the upper surface of the PE film for 30 s by the ICP etcher, such that a fluorocarbon layer is deposited on the nano-textured structure of the PE film to complete modification and take out the film.

Step 2) is Specified as Follows:
adding a 15% v/v dimethyl sulfoxide (DMSO) solution to a poly(3,4-ethylenedioxythiophene)-poly(styrenesulfonate) (PEDOT:PSS) solution and stirring vigorously at room temperature for 6 h to obtain a conductive polymer solution;
cleaning the lower surface of the modified film and conducting $O_2$ plasma treatment for 5 min;
spin-coating 20 L of the conductive polymer solution on the lower surface of the modified film after the $O_2$ plasma treatment through a square mold with a horizontal section of 3*3 cm; and
drying at room temperature to prepare the lower electrode on the lower surface of the modified film.

Step 3) is specified as follows: sticking a piece of thin conductive copper tape (with a width of about 1 mm) on the upper surface of the modified film (namely, a superhydrophobic surface) at the center line of the lower electrode to prepare the upper electrode on the upper surface of the modified film.

In addition, in the present disclosure, an upper electrode of the film is constructed by sticking a piece of ultra-thin copper tape on the superhydrophobic surface, and the TENG with high output and a double-electrode working mode based on the superhydrophobic modified greenhouse film is constructed. Under the requirement of overall transparency, the TENG with high output performance is prepared to collect raindrop energy in the environment.

Step 4) is specified as follows: connecting the upper and lower electrodes with two pieces of copper tape, respectively to lead out an output electrical signal.

The present disclosure first endows the film with superhydrophobic property by ICP treatment, and the light transmittance does not decrease significantly. Second, the electrode is an important part of the TENG. Considering the actual use scenario of the present disclosure, the required electrode is not like the traditional copper electrode, which is hard and opaque. The electrode required to construct the TENG must meet the requirements of transparency, flexibility, and excellent electrical conductivity. Conductive polymers, such as PEDOT:PSS, polyaniline (PAni), and polypyrrole (PPy), have been widely used as electrodes due to their excellent electrical properties, electrochemical properties, and biocompatibility. However, their poor adhesion cannot guarantee strong adhesion between conductive polymers and substrates, which is not suitable for the TENG constructed from plastic film. Recently, functional coatings with controllable thickness and strong adhesion have been applied to various substrates with arbitrary shapes, enabling new applications in engineering and medicine. Conductive polymers with different rheological properties can be applied to target substrates by different operations (such as brushing, casting, dipping, and spraying). Therefore, the application of functional conductive polymer coatings is of great help to the construction of TENG based on greenhouse films. Due to the high electrical conductivity and chemical stability, the PEDOT:PSS solution is selected as a conductive polymer solution, and its electrical conductivity can be further improved by doping with DMSO. In order to achieve strong adhesion between the PEDOT:PSS coating and the lower surface of the film, the lower surface of the film is etched with $O_2$ plasma. In this process, the highly reactive plasma species will etch the surface of the film and produce abundant polar hydrophilic groups, such as hydroxyl (—OH) to enhance the hydrophilicity of the lower surface. Therefore, stable adhesion can be achieved through strong electrostatic and hydrogen bonding interactions between the charged PEDOT:PSS and the —OH of the film. By spin coating or brushing, only a small amount of mixed PEDOT:PSS dispersion (about 20 L) is required to adhere to the film. Due to the small amount, the conductive polymer is easy to dry at room temperature, forming a light blue transparent and ultra-thin electrode layer, which will not peel off after repeated friction. The surface resistance of the film is measured using a standard four-point probe, and after averaging multiple measurements, the resistance is essentially stabilized at about 150 Ω/.

The working principle of the TENG based on untreated (UT) and superhydrophobic modified films prepared by the present disclosure is shown in FIG. 5.

When a first droplet hits the surface of the film without contacting the upper electrode, it is still in the traditional single-electrode mode. The generation of charges is subject to the interfacial screening effect, and no significant output is formed. Once the droplet contacts the upper electrode, it loses electrons and becomes positively charged, and the droplet surface gains electrons due to liquid-solid contact electrification. Thus, the film can act as a "reservoir" to store the charge. Positive charges are electrostatically induced on the lower electrode and transferred to the upper electrode, creating an electrical output.

As the droplet continues to spread, the transfer of charge between the upper and lower electrodes will continue until the droplet spreads completely on the upper electrode. At this time, the originally disconnected elements (lower electrode/film/upper electrode) can be connected into a closed-loop electrical system, transforming the traditional interfacial effect between the triboelectric layer and the lower electrode into the bulk effect among the three components.

Then, the first droplet retracts and flows away from the upper electrode, and the charge flows back from the upper electrode to the lower electrode. Finally, the first droplet is completely separated from the upper electrode, and all the charge returns to the lower electrode. Then a second droplet hits the surface, and the negative charge on the surface of the film will attract the counterions of the droplet. A new cycle begins, resulting in a continuous electrical output.

The present disclosure conducts functional modification on the lower surface of the film and the conductive polymer, and the strong adhesion between the two can be realized by simple spin coating and brushing. In addition, the small enough thickness meets the requirement of transparency. A greenhouse film-based TENG with high output is constructed.

Therefore, in the present disclosure, the greenhouse plastic film is used as the triboelectric layer, the conductive polymer coating is used as the lower electrode, and the ultra-thin copper tape is used as the upper electrode. With the overall transparency requirements met, the TENG with high output performance and a double-electrode working mode is prepared to collect raindrop energy in the environment.

The output performance of the TENG constructed using the superhydrophobic modified film is greatly improved compared with that of the TENG constructed using the original UT film, and the construction process of the TENG is simple and easy to implement.

The present disclosure has the following beneficial effects:

The present disclosure realizes superhydrophobic modification treatment of the greenhouse film for the first time and uses the ICP etching method. Compared with the common treatment process, the method has a simpler process and high and fast selectivity, is easy for large-scale production, and most importantly, has little effect on the transparency of the film. The treated film has superhydrophobic and excellent self-cleaning properties, and the light transmittance is not significantly reduced, which not only prolongs the service life but also is more conducive to the utilization of solar energy by plants in the greenhouse.

The present disclosure utilizes the ICP etching method to construct a nano-textured structure on the surface of the greenhouse film, and the surface of the greenhouse film is further covered with a layer of fluorocarbon compound with low surface energy. The modified film has superhydrophobic and self-cleaning properties.

The present disclosure endows the greenhouse film with superhydrophobic and self-cleaning properties. On the one hand, it is helpful to prolong its service life, and on the other hand, the maintenance of its light transmittance is more conducive to the full utilization of solar energy by the plants in the greenhouse.

The present disclosure also realizes the collection of raindrop energy based on the greenhouse film for the first time. The front and back sides of the film are subjected to superhydrophobic and hydrophilic treatment, respectively. The technologies used are ICP treatment and $O_2$ plasma etching, such that the upper surface of the film has hydrophobic property, while the lower surface is hydrophilic. Furthermore, by using the conductive polymer, the strong adhesion between the conductive polymer and the hydrophilic lower surface is improved, and the problem of poor adhesion between the conductive polymer and the substrate is solved, and the lower electrode is successfully prepared. The upper electrode is a piece of ultra-thin copper tape stuck on the upper surface of the film, thereby constructing a double-electrode structure based on the upper and lower electrodes. Finally, compared with the TENG constructed by using the UT film, the TENG based on the superhydrophobic film constructed in the present disclosure can realize the efficient collection of the raindrop energy, and the output performance is doubled, which makes up for the photovoltaic equipment not being able to work well on rainy days.

DETAILED DESCRIPTION OF THE EMBODIMENTS

Figure 1A:
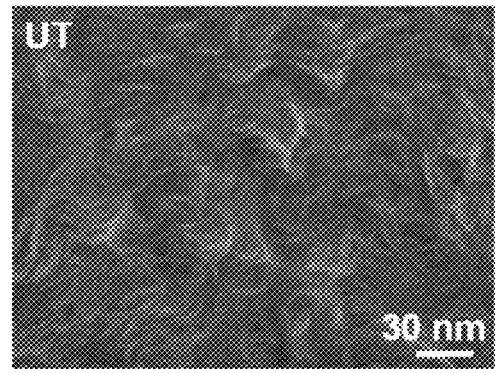
FIGS. 1A-1F show an SEM characterization of a film after ICP treatment under different RF powers in the present disclosure.
Figure 1B:
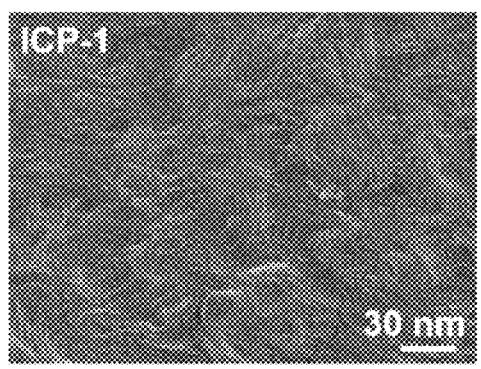
Figure 1C:
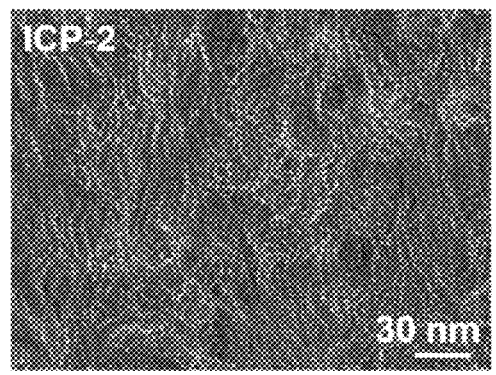
Figure 1D:
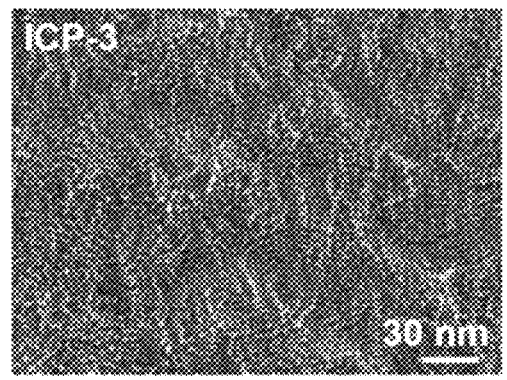
Figure 1E:
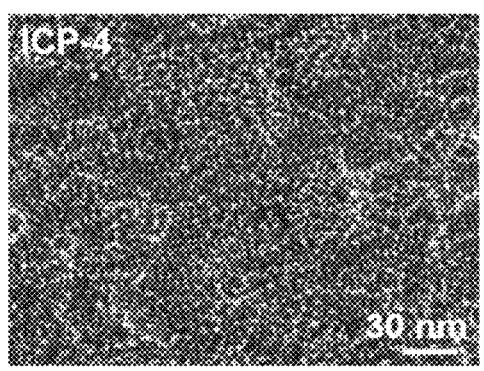
Figure 1F:
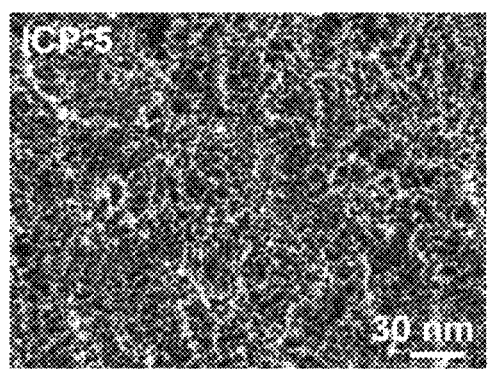
Figure 2A:
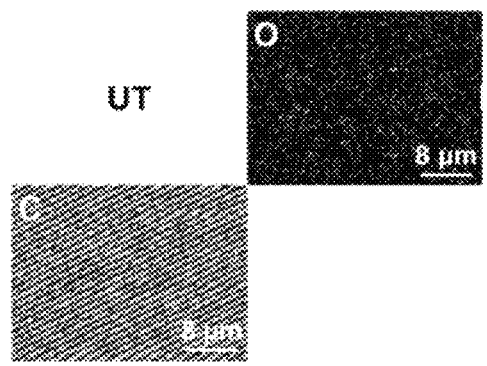
FIGS. 2A-2F show an EDS characterization of the film after ICP treatment under different RF powers in the present disclosure.
Figure 2B:
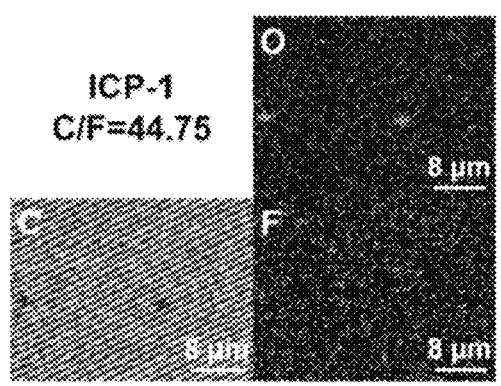
Figure 2C:
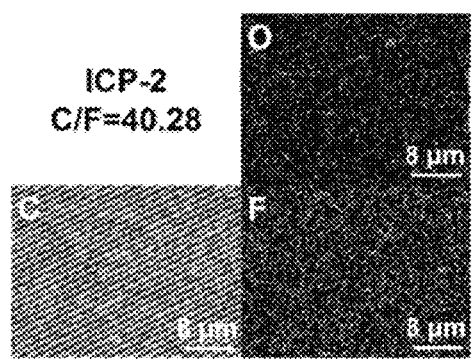
Figure 2D:
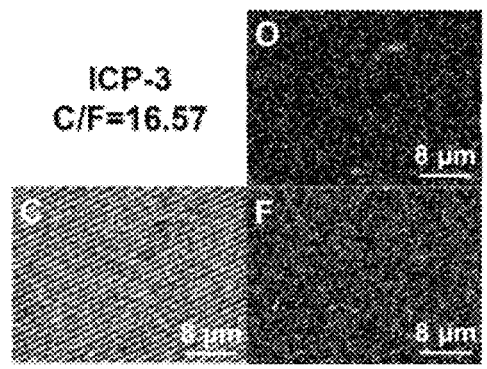
Figure 2E:
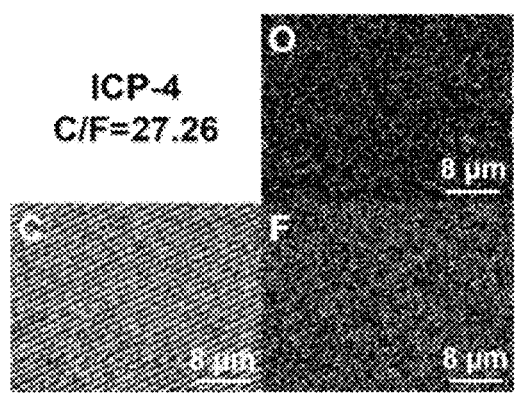
Figure 2F:
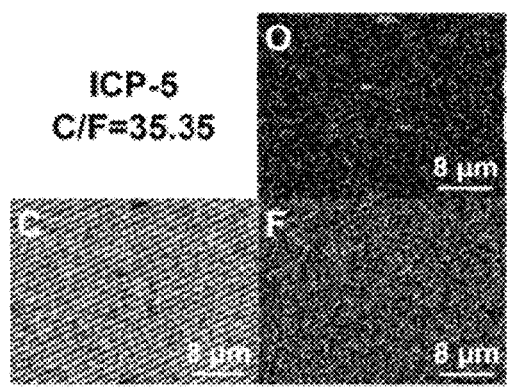
Figure 3A:
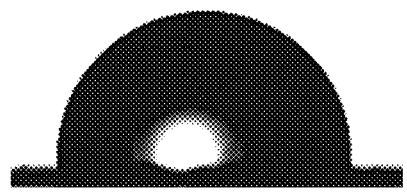
FIGS. 3A-3F show water static contact angles of the film after ICP treatment under different RF powers in the present disclosure.
Figure 3B:
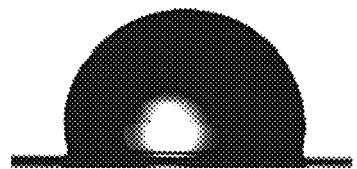
Figure 3C:
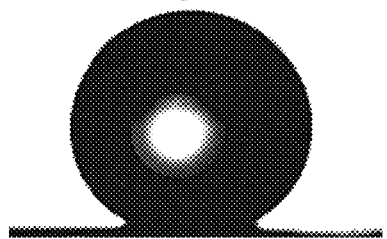
Figure 3D:
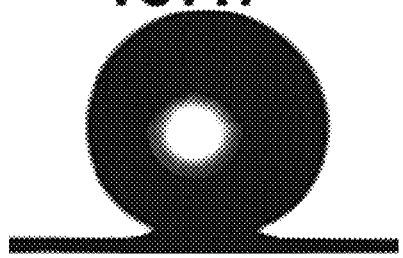
Figure 3E:
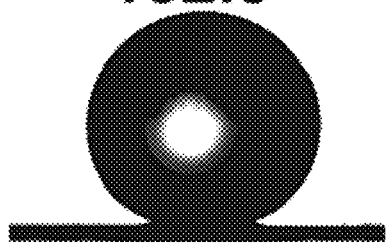
Figure 3F:
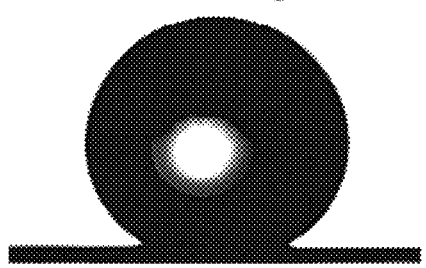

The present disclosure is described in more detail hereinafter with reference to the accompanying drawings and specific implementations.

The superhydrophobic modification treatment step of the greenhouse film of the present disclosure involves constructing a nano-textured structure on the surface of the film and covering the surface of the film with a layer of substances with low surface energy through a two-step treatment of ICP etching to endow the film with excellent superhydrophobic and self-cleaning properties.

EXAMPLES OF THE PRESENT DISCLOSURE ARE AS FOLLOWS

Example 1

1) A PE film was placed in an ICP etcher.
2) Under conditions of a set ICP power of 100 W and an RF power of 50 W, gas selection of $O_2$ and $CHF_3$ (flow rates of $O_2$ and $CHF_3$ were set as 15 and 45 sccm respectively), and air pressure of 30 mTorr, an upper surface of the PE film was etched for 10 min by the ICP etcher, such that a nano-textured structure was formed on the upper surface of the PE film to obtain a nanostructured PE film.

3) Under conditions of a set ICP power of 100 W and an RF power of 50 W, gas selection of only $C_4F_8$ (a flow rate of the $C_4F_8$ was set as 50 sccm), and air pressure of 30 mTorr, the upper surface of the PE film was deposited for 30 s by the ICP etcher, such that a fluorocarbon layer was deposited on the nano-textured structure of the PE film to complete modification and take out the film.

In the specific implementation, five RF powers of 0, 25, 50, 75, and 100 W were used for testing.

After the above two-step treatment, the UT films and the films subjected to five ICP (ICP-1/2/3/4/5) treatments were characterized by SEM, and the results are shown in FIGS. 1A-1F. For the UT film, it could be seen that some microcracks were randomly distributed on the surface, and these microcracks were caused by the transportation of the film after purchase and cleaning of the film.

For the ICP-treated film, it could be seen that the surface was rough, forming nano-bumps, and the distribution was relatively uniform. In addition, with the increase of RF power, the aspect ratio of the nano-bumps increased, and the nano-bumps evolved into nanowires, forming obvious nano-textures. The reason for such a morphological structure lies in different crystalline regions of the selected PE plastic film. The PE was a semi-crystalline material composed of crystalline regions and amorphous regions. However, the etching speed of plasma in different crystalline regions was different. The amorphous region was preferentially dissociated due to the low crystallinity, and the etching was serious, while in the crystalline region, due to the high crystallinity and low etching degree, nano-textures were formed on the surface of PE.

As the RF power was increased, the surface roughness also increased and the etching became more uniform. When the RF power exceeded 50 W, the nanowires would become entangled and aggregated, maintaining the nanowire array structure perpendicular to the base surface. Therefore, from SEM characterization, it could be seen that the ICP treatment of the film could form a nano-scale rough structure on the surface.

FIGS. 2A-2F show an EDS characterization of 6 films. The EDS characterization technology is used to measure the elemental composition of the material. It can be seen from the figure that compared with the UT films, all the ICP-treated films contain fluorine (F), while the UT films only contain oxygen (O) and carbon (C), which are the basic constituent elements of the PE material. Moreover, with the increase of RF power, the C element shows a trend of first decreasing and then increasing, while the F element first increases and then decreases. The C/F ratio is the smallest at ICP-3, indicating that when the RF power is at 50 W, the F element content on the surface of the film is the most abundant, that is, the fluorocarbon compound with low surface energy covered on the surface is the most abundant.

FIGS. 3A-3F show water static contact angles of the films with six different treatment processes. The water static contact angles being greater than 1500 indicates that the material has superhydrophobic property. It can be seen from the figure that the contact angle of the original UT film is only about 95°, which means that the hydrophobicity of the original film is poor, while the film treated by ICP has a higher water static contact angle. The contact angles of ICP-3 and ICP-4 both exceed 150°, and the contact angle of ICP-3 is the largest, reaching about 158°, indicating that the film under this treatment process (RF power of 50 W) has the optimal superhydrophobic property, which corresponds to the above SEM and EDS characterizations. When the RF power is 50 W, the surface of the film has an excellent nano-textured structure, and the surface contains the most abundant fluorocarbon compound with low surface energy, so the superhydrophobic property of the film at this treatment is the best.

Figure 4:
FIG. 4 is a characterization diagram of the self-cleaning performance of a superhydrophobic modified film in the present disclosure.
Figure 5:
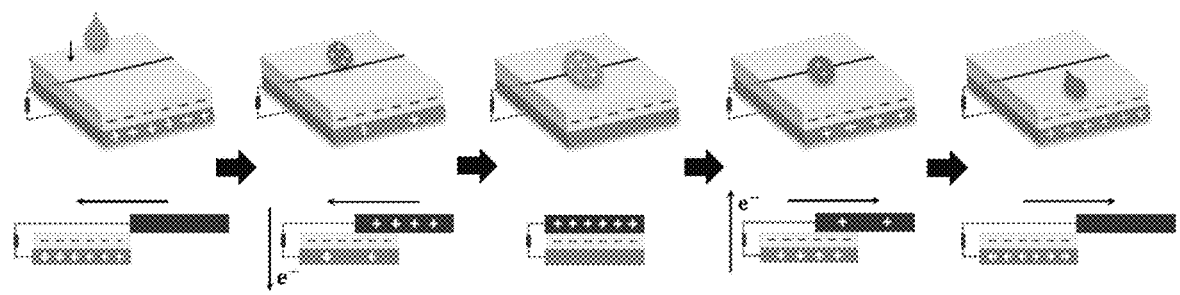
FIG. 5 is a schematic diagram of a working mechanism of a TENG in the present disclosure.

FIG. 4 shows a characterization of self-cleaning performance of the film. After the above three steps of verification, it is found that when the ICP power is 100 W and the RF power is 50 W, the film after two-step ICP etching has the optimal superhydrophobic property. The self-cleaning ability of the film is further verified after the film is processed under this process. The surface of the film is covered with dry soil, dead leaves, and hay powder. Because in actual use, soil and grass clippings are the easiest to adhere to the surface of greenhouse film, thereby posing a serious threat to the light transmittance of the film and greatly reducing the light transmittance of the film, which is not conducive to the growth of crops in the greenhouse. Therefore, after these powders are distributed on the surface of the film, the surface is washed with water droplets. It can be seen from the figure that the film after ICP treatment has excellent self-cleaning ability, and these powders are easily washed away. This also proves that in the actual use of the superhydrophobic modified film in the future, even if a lot of dust is adsorbed on the surface, the surface can be easily washed with only a small amount of water, which not only prolongs the service life of the film, but also is helpful for the utilization of solar energy by plants in the greenhouse.

Example 2

1) Preparation of a Modified Film (Superhydrophobic Film) with Superhydrophobic Property on an Upper Surface 1.1) A PE film was placed in an ICP etcher.

1.2) Under conditions of a set ICP power of 100 W and an RF power of 50 W, gas selection of $O_2$ and $CHF_3$ (flow rates of $O_2$ and $CHF_3$ were set as 15 and 45 sccm respectively), and air pressure of 30 mTorr, an upper surface of the PE film was etched for 10 min by the ICP etcher, such that a nano-textured structure was formed on the upper surface of the PE film to obtain a nanostructured PE film.

1.3) Under conditions of a set ICP power of 100 W and an RF power of 50 W, gas selection of $C_4F_8$ (a flow rate of the $C_4F_8$ was set as 50 sccm), and air pressure of 30 mTorr, the upper surface of the PE film was deposited for 30 s by the ICP etcher, such that a fluorocarbon layer was deposited on the nano-textured structure of the PE film to complete modification and take out the film.

2) Preparation of a Lower Electrode 2.1) A 15% v/v DMSO solution was added to a PEDOT: PSS solution, and stirred vigorously at room temperature for 6 h to obtain a conductive polymer solution.

2.2) The lower surface of the modified film was cleaned, and $O_2$ plasma treatment was conducted for 5 min.

2.3) 20 μL of the conductive polymer solution was spin coated on the lower surface of the modified film after the $O_2$ plasma treatment through a square mold with a horizontal section of 3*3 cm.

2.4) Drying was conducted at room temperature to prepare the lower electrode on the lower surface of the modified film.

3) Preparation of an Upper Electrode

A piece of thin conductive copper tape (with a width of about 1 mm) was stuck on the upper surface of the modified film at the center line of the lower electrode to prepare the upper electrode.

4) Preparation of a TENG: The Upper and Lower Electrodes were Connected with Two Pieces of Copper Tape, Respectively to Lead Out an Output Electrical Signal.

The specific implementation measured an output voltage: The copper tape led out from the upper and lower electrodes was connected to positive and negative electrodes of an oscilloscope to measure the output voltage.

In the specific implementation, a dripping device and a flow regulator were assembled to simulate the rainfall scene and the raindrop energy collection scene. The device could adjust the falling height (cm) and the frequency (Hz) of the water droplets.

Figure 6A:
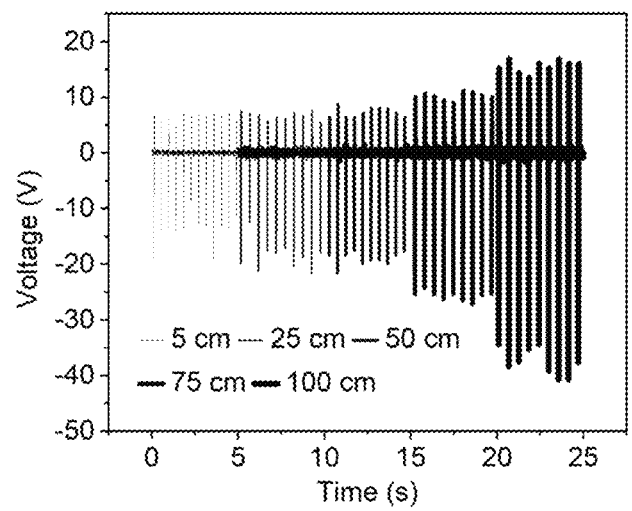
FIGS. 6A-6B show the output performance results of the TENG for water droplets falling at different heights in the present disclosure.
Figure 6B:
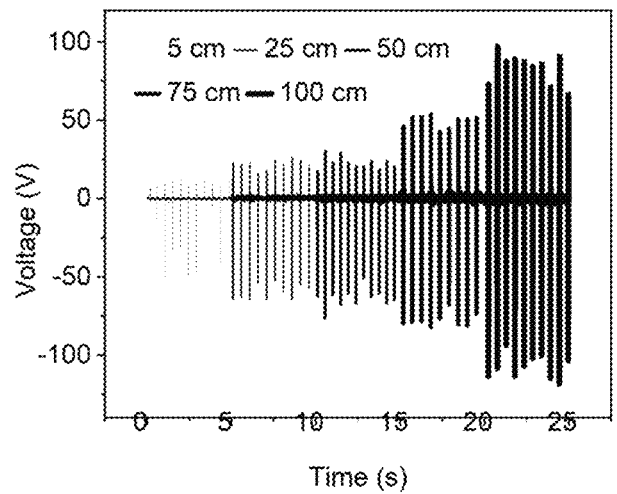

In order to measure the output performance of water droplets falling at different heights, the heights of the water outlet from the film were set to 5, 25, 50, 75, and 100 cm respectively, the falling frequency of water droplets was controlled to 2 Hz, and the output voltage was displayed by an oscilloscope. It could be seen from FIGS. 6A-6B that at five different falling heights, the output performance of the TENG based on the superhydrophobic film was generally higher than that of the TENG based on the UT film, and the output voltage was about 3 times that of the UT film. With the increase of the falling height of water droplets, the output voltage of the TENGs based on the two films gradually increased, especially when the height was 100 cm, the voltage was the largest. The water droplets falling from a higher altitude fell faster than falling from a lower altitude. When the water droplets hit the upper surface of the film, they were quickly divided into several small droplets. At this time, for the surface of the superhydrophobic film, these droplets could slide off quickly. For the surface of the UT film, its hydrophobicity was poor, and the droplets could not slide off quickly, but a water layer was formed on the surface, which was not conducive to the transfer of charges. Because the primary electrical output was generated due to the process of the previous drop of water flowing away and the next drop being connected. If the hydrophobicity of the film was poor, the water droplets could not flow easily, which inevitably resulted in a lower voltage output. In summary, the film after superhydrophobic treatment was used as a triboelectric layer to construct a TENG, which was more efficient for raindrop energy collection. In addition, the output was still very excellent for water droplets falling from a high altitude, which was very meaningful for raindrop energy collection during actual rainfall.

Figure 7A:
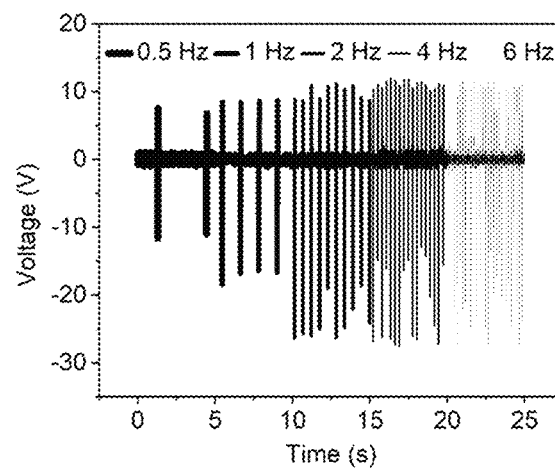
FIGS. 7A-7B show the output performance results of the TENG for water droplets falling at different frequencies in the present disclosure.
Figure 7B:
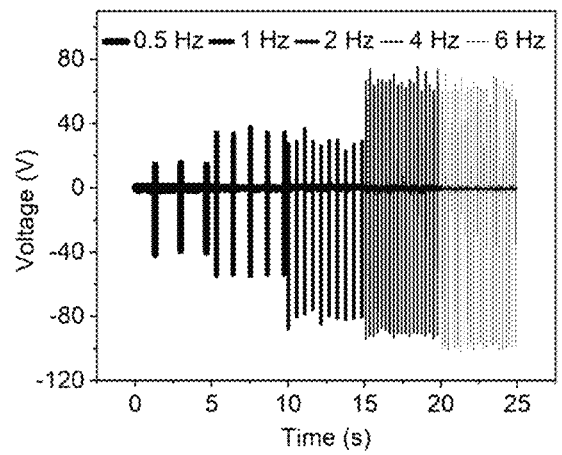

In order to measure the output performance of water droplets falling at different frequencies and facilitate experimental operation, the heights of the water outlet from the film were set to 15 cm, the falling frequency was controlled to 0.5, 1, 2, 4, and 6 Hz, and the output voltage was displayed by an oscilloscope. It can be seen from FIGS. 7A-7B that the output performance of the TENG based on the superhydrophobic film was also higher than that of the TENG based on the UT film under five different falling frequencies, and the output voltage was also about 3 times that of the UT film, which was consistent with the results of the above-mentioned investigation. In addition, with the increase of the falling frequency of water droplets, the output voltage of the TENGs based on the two films gradually increased. The reason for this difference was closely related to the hydrophobicity of the film. For the UT film, the hydrophobicity was poor, the water droplets would stay on the surface, and when the falling frequency of water droplets further increased, a water flow was formed directly on the surface. Therefore, a higher falling frequency was less favorable for the charge transfer. For the superhydrophobic film, no matter how much the falling frequency was increased, the water droplets could slide off quickly, and the liquid-solid contact interface could be refreshed stably without forming a water layer. Therefore, the increase in the falling frequency of droplets meant that the surface charges were rapidly injected to the saturation state, resulting in a greater charge transfer and higher output. Therefore, the above studies showed that the TENG with superhydrophobic surface had good output performance for raindrops from the sky regardless of the amount of rainfall.

Figure 8A:
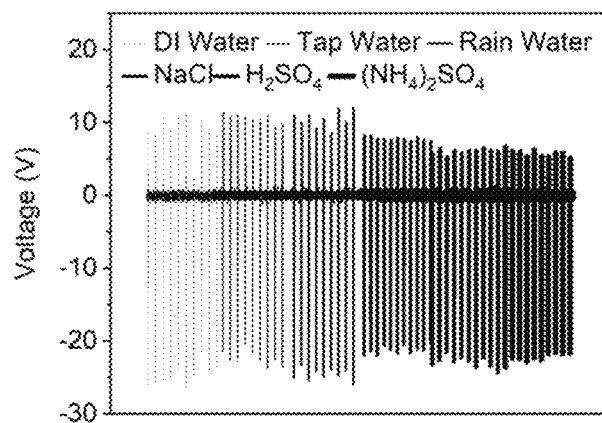
FIGS. 8A-8B show the output performance results of the TENG for water droplets of different compositions in the present disclosure.
Figure 8B:
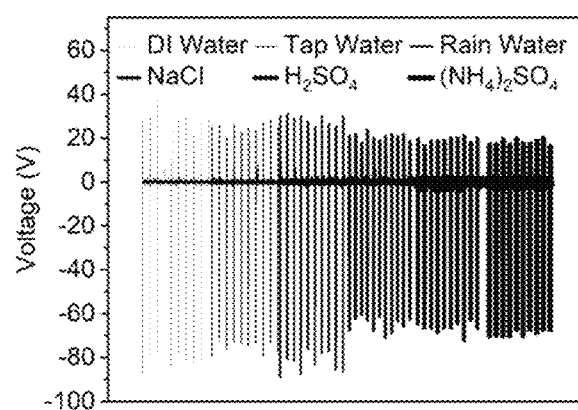

Considering the complex composition of actual rainwater, the practical application performance of the constructed TENG is further explored in different solutions. Five different solutions were selected, including deionized water, tap water, collected rainwater, 0.01 M sodium chloride solution, 0.01 M sulfuric acid solution, and 0.01 M ammonium sulfate solution. The falling height of the water droplets was set to 15 cm, and the falling frequency was set to 2 Hz. The reason for selecting these solutions was that the main component of rainwater is water, and the rainwater also contained a small amount of sulfur dioxide, nitrogen dioxide, impurities and floating dust, while acid rain with a pH less than 5.6 contained more sulfate ions, ammonium ions, chloride ions, and sodium ions. Considering these conditions, these solutions were selected for exploration. It can be seen from FIGS. 8A-8B that the output voltage of deionized water was the highest, followed by rainwater and tap water; sodium chloride, sulfuric acid, and ammonium sulfate solutions had lower output. In addition, the output of the TENG constructed with the film subjected to superhydrophobic treatment was also about 3 times that of the TENG constructed with the UT film. There might be two reasons for the difference in output voltage in different solutions, one was that the initial conductivity of different liquids was different, and the other was that the induced charges generated by the liquid-solid interaction were different. Compared to other liquids, deionized water had the highest output performance because it did not contain any impurities and ions, so there was less interference. The impurities and ions in the solution would interfere with the contact electrification between the liquid and the surface of the film, resulting in charge screening, which in turn reduces the output performance. Therefore, these liquids had limited charge retention capacity, which would undoubtedly reduce the charge density of the surface of the film. The output voltage of the collected rainwater was also higher than that of other liquids, possibly due to the fact that it had previously carried positive charges as fell from the air. The raindrops were charged in contact with air or floating particles, creating a triboelectric charge. In summary, the TENG constructed with the superhydrophobic film had excellent output for water droplets in different solutions, so it is very promising in practical applications.

Figure 9:
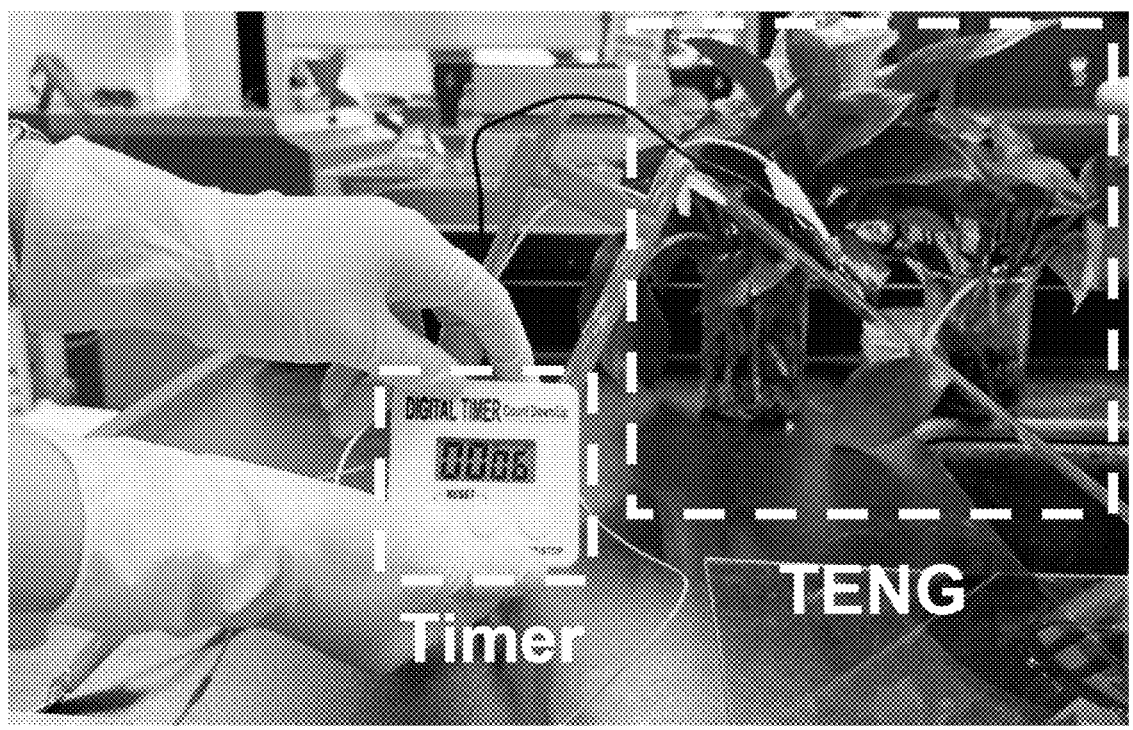
FIG. 9 is an actual energy supply application diagram of the TENG in the present disclosure.

Finally, the TENG based on the film subjected to superhydrophobic treatment was placed on an acrylic plate and tilted about 450 to simulate the top of the greenhouse. The dripping height was controlled to 15 cm, the frequency was 2 Hz, and the dripping liquid was collected rainwater. As shown in FIG. 9, the TENG could charge the capacitor by collecting raindrop energy, and when charged for a period of time, the capacitor could supply power to a timer without a battery. If the timer could successfully display the value, it meant that the TENG has practical use value. After raindrop energy was collected for about 10 min, the timer could be successfully powered by a 10 ρF capacitor to work normally for about 15 s. Therefore, this proved that the TENG has good practical application value and could also successfully supply power to small electronic devices like timers or common temperature and humidity sensors in greenhouses.

What is claimed is:

1. A preparation method for a greenhouse film-based triboelectric nanogenerator (TENG), comprising:
   i) preparing a superhydrophobic modified film with a superhydrophobic property on an upper surface of the superhydrophobic modified film;
   ii) preparing a lower electrode;
   iii) preparing an upper electrode; and
   iv) connecting the upper electrode and the lower electrode;
   wherein the greenhouse film-based TENG comprises the superhydrophobic modified film, the lower electrode, and the upper electrode, wherein the lower electrode is arranged on a lower surface of the superhydrophobic modified film, the upper electrode is arranged on the upper surface of the superhydrophobic modified film, and the superhydrophobic modified film is modified by a superhydrophobic modification method for a greenhouse film;
   wherein the superhydrophobic modification method comprises:
   1) placing a polyethylene (PE) film in an inductively coupled plasma (ICP) etcher;
   2) etching an upper surface of the PE film for a first predetermined time by the ICP etcher, wherein a nano-textured structure is formed on the upper surface of the PE film; and
   3) depositing the upper surface of the PE film for a second predetermined time by the ICP etcher, wherein a fluorocarbon layer is deposited on the nano-textured structure to complete a modification and take out the PE film;
   wherein step ii) comprises:
   adding a 15% v/v dimethyl sulfoxide (DMSO) solution to a poly(3,4-ethylenedioxythiophene)-poly(styrenesulfonate) (PEDOT:PSS) solution, and stirring vigorously at a room temperature for 6 h to obtain a conductive polymer solution;
   cleaning the lower surface of the superhydrophobic modified film, and conducting an $O_2$ plasma treatment for 5 min;
   spin-coating the conductive polymer solution on the lower surface of the superhydrophobic modified film after the $O_2$ plasma treatment through a square mold; and
   drying at the room temperature to prepare the lower electrode on the lower surface of the superhydrophobic modified film.

2. The preparation method according to claim 1, wherein in step 2) of the superhydrophobic modification method, the upper surface of the PE film is etched at a set ICP power of 100 W and a radio frequency (RF) power of 50 W under the presence of $O_2$ and $CHF_3$ at an air pressure of 30 mTorr for 10 min.

3. The preparation method according to claim 2, wherein in step 2) of the superhydrophobic modification method, $O_2$ and $CHF_3$ have a flow ratio of 1:3.

4. The preparation method according to claim 1, wherein in step 3) of the superhydrophobic modification method, the upper surface of the PE film is deposited at a set ICP power of 100 W and an RF power of 50 W under the presence of $C_4F_8$ at an air pressure of 30 mTorr for 30 s.

5. The preparation method according to claim 4, wherein in step 3) of the superhydrophobic modification method, a flow rate of the $C_4F_8$ is set as 50 sccm.

6. The preparation method according to claim 1, wherein in the greenhouse film-based TENG, the greenhouse film-based TENG is for a raindrop energy collection, the greenhouse film-based TENG is constructed on the greenhouse film, and during rainfall, raindrops contact the upper electrode on the upper surface of the superhydrophobic modified film to generate a continuous electrical output through a process of contact electrification and electrostatic induction.

7. A preparation method for a greenhouse film-based TENG, comprising:
   i) preparing a superhydrophobic modified film with a superhydrophobic property on an upper surface of the superhydrophobic modified film;
   ii) preparing a lower electrode;
   iii) preparing an upper electrode; and
   iv) connecting the upper electrode and the lower electrode;
   wherein the greenhouse film-based TENG comprises the superhydrophobic modified film, the lower electrode, and the upper electrode, wherein the lower electrode is arranged on a lower surface of the superhydrophobic modified film, the upper electrode is arranged on the upper surface of the superhydrophobic modified film, and the superhydrophobic modified film is modified by a superhydrophobic modification method for a greenhouse film;
   wherein the superhydrophobic modification method comprises:
   1) placing a polyethylene (PE) film in an inductively coupled plasma (ICP) etcher;
   2) etching an upper surface of the PE film for a first predetermined time by the ICP etcher, wherein a nano-textured structure is formed on the upper surface of the PE film; and
   3) depositing the upper surface of the PE film for a second predetermined time by the ICP etcher, wherein a fluorocarbon layer is deposited on the nano-textured structure to complete a modification and take out the PE film;
   wherein step iii) comprises: sticking a piece of thin conductive copper tape on the upper surface of the superhydrophobic modified film at a center line of the lower electrode to prepare the upper electrode on the upper surface of the superhydrophobic modified film.

8. A preparation method for a greenhouse film-based TENG, comprising:
   i) preparing a superhydrophobic modified film with a superhydrophobic property on an upper surface of the superhydrophobic modified film;
   ii) preparing a lower electrode;
   iii) preparing an upper electrode; and
   iv) connecting the upper electrode and the lower electrode with two pieces of copper tape, respectively to lead out an output electrical signal,
   wherein the greenhouse film-based TENG comprises the superhydrophobic modified film, the lower electrode, and the upper electrode, wherein the lower electrode is arranged on a lower surface of the superhydrophobic modified film, the upper electrode is arranged on the upper surface of the superhydrophobic modified film, and the superhydrophobic modified film is modified by a superhydrophobic modification method for a greenhouse film;
   wherein the superhydrophobic modification method comprises:
   1) placing a polyethylene (PE) film in an inductively coupled plasma (ICP) etcher;
   2) etching an upper surface of the PE film for a first predetermined time by the ICP etcher, wherein a nano-textured structure is formed on the upper surface of the PE film; and
   3) depositing the upper surface of the PE film for a second predetermined time by the ICP etcher, wherein a fluorocarbon layer is deposited on the nano-textured structure to complete a modification and take out the PE film.

* * * * *